United States Patent
Hiratsuka et al.

(10) Patent No.: US 6,773,466 B1
(45) Date of Patent: Aug. 10, 2004

(54) METHOD FOR PRODUCING AN ELECTRIC DOUBLE LAYER CAPACITOR

(75) Inventors: Kazuya Hiratsuka, Kanagawa (JP); Takeshi Kawasato, Kanagawa (JP); Naoki Yoshida, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/517,579

(22) Filed: Mar. 2, 2000

(30) Foreign Application Priority Data

Mar. 3, 1999 (JP) .......................................... 11-055932

(51) Int. Cl.$^7$ ................................................. H01G 9/00
(52) U.S. Cl. ..................................... 29/25.03; 361/502
(58) Field of Search ........................... 29/25.01, 25.02, 29/25.03; 361/502, 505, 512

(56) References Cited

U.S. PATENT DOCUMENTS

| 4,725,927 A |   | 2/1988  | Morimoto et al. ........... 361/433 |
| 5,351,164 A | * | 9/1994  | Grigortchak et al. ....... 361/502 |
| 5,953,204 A |   | 9/1999  | Suhara et al. ................ 361/502 |
| 5,969,936 A |   | 10/1999 | Kawasato et al. .......... 361/502 |
| 6,038,123 A |   | 3/2000  | Shimodaira et al. ........ 361/502 |
| 6,152,970 A | * | 11/2000 | Wei et al. ................... 29/25.03 |

OTHER PUBLICATIONS

Patent Abstracts of Japan, vol. 1998, No. 06, Apr. 30, 1998, JP 10 041199, Feb. 13, 1998.
Patent Abstracts of Japan, vol. 1995, No. 04, May 31, 1995, JP 07 022295, Jan. 24, 1995.
Patent Abstracts of Japan, vol. 1997, No. 07, Jul. 31, 1997, JP 09 082582, Mar. 28, 1997.

* cited by examiner

*Primary Examiner*—Ha Tran Nguyen
(74) *Attorney, Agent, or Firm*—Oblon, Spivak, McClelland, Maier & Neustadt, P.C.

(57) ABSTRACT

A method for producing an electric double layer capacitor, which comprises impregnating an element comprising positive and negative electrodes facing each other with a separator interposed between them, with an organic electrolyte capable of forming an electric double layer on the surface of the electrodes to store electric charge, and then applying a voltage to the element, wherein said positive and negative electrodes are made of electrodes containing a carbonaceous material having a specific surface area of from 100 to 3,000 m$^2$/g, and said organic electrolyte contains benzene or its chlorine derivative having at least one hydrogen atom of benzene substituted by a chlorine atom.

22 Claims, No Drawings

METHOD FOR PRODUCING AN ELECTRIC DOUBLE LAYER CAPACITOR

The present invention relates to a method for producing an electric double layer capacitor which is excellent in reliability of the performance for a long period of time and which has a high withstand voltage and a high energy density.

An electric double layer capacitor has excellent properties with respect to the output density and the long term reliability for charge and discharge cycles, but it has a problem such that its energy density is low as compared with e.g. a lithium ion secondary cell. The amount of energy to be stored in a capacitor is proportional to the capacitance of the capacitor and to the square of the applied voltage. Accordingly, the energy density can effectively be increased by increasing the withstand voltage of the capacitor.

The withstand voltage of an electric double layer capacitor is restricted basically by the electrochemical decomposition voltage of the electrolyte. When an organic electrolyte having a high withstand voltage as compared with an aqueous electrolyte, is used as the electrolyte, electrolysis is likely to take place due to impurities, particularly water, contained in the electrolyte. Accordingly, for the organic electrolyte, both the solvent and the electrolytic salt will be used as highly purified and dehydrated.

On the other hand, for the electrodes for an electric double layer capacitor, an electrode material having a high surface area is used, and when it is to be combined with the above organic electrolyte, activated carbon is usually employed as the electrode material having a high surface area. Activated carbon is a porous material having fine pores of a few nm, but it is likely to adsorb moisture in the environment, as it has a high adsorbing ability. Accordingly, activated carbon is required to be highly dehydrated during the process for producing an electric double layer capacitor.

In order to completely remove moisture from fine pores of activated carbon, it is usually required to carry out dehydration treatment at a high temperature of at least 300° C. in vacuum or in an inert gas atmosphere. However, activated carbon particles are usually molded by means of a binder such as an organic polymer on a current collector to form an electrode, and the binder undergoes thermal decomposition by high temperature treatment of at least 300° C. Therefore, heat treatment may usually be possible only at a temperature of not higher than 200° C., whereby it is difficult to completely remove moisture in the activated carbon electrode.

For the purpose of increasing the energy density, an electric double layer capacitor employing an organic electrolyte is operated at a voltage of at least 2 V which is higher than the theoretical decomposition voltage (1.23 V) of water. Therefore, when a capacitor cell is assembled and then a voltage is applied for operation, moisture remaining in the pores will be electrolyzed to generate a gas. It has been found that the generated gas will gradually accumulate in pores of activated carbon and will remain in the interior of the element comprising electrodes facing each other with a separator interposed between them and impregnated with the electrolyte, without being discharged from the element.

If the capacitor is used for a long period of time under such a condition, the electrolyte in pores will be expelled by the generated gas, whereby the expected capacitance will not be obtained. Further, electrically conductive paths by ion transfer within pores will be cut off, thus leading to deterioration of the performance such as a decrease in the capacitance or an increase of the internal resistance.

Under these circumstances, it is an object of the present invention to solve the above-mentioned problems of the prior art and to provide a method for producing an electric double layer capacitor which is excellent in reliability of the performance for a long period of time and which has a high operation voltage and a high energy density.

The present invention provides a method for producing an electric double layer capacitor, which comprises impregnating an element comprising positive and negative electrodes facing each other with a separator interposed between them, with an organic electrolyte capable of forming an electric double layer on the surface of the electrodes to store electric charge, and then applying a voltage to the element, wherein said positive and negative electrodes are made of electrodes containing a carbonaceous material having a specific surface area of from 100 to 3,000 m²/g, and said organic electrolyte contains benzene or its chlorine derivative having at least one hydrogen atom of benzene substituted by a chlorine atom.

Now, the present invention will be described in detail with reference to the preferred embodiments.

In the present invention, benzene or its chlorine derivative having at least one hydrogen atom of benzene substituted by a chlorine atom (hereinafter referred to as "a chlorine derivative of benzene") is represented by a compound of the formula 1. In the formula 1, n is an integer of from 1 to 6.

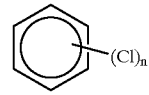

Formula 1

In the present invention, the benzene or its chlorine derivative is preferably at least one member selected from the group consisting of benzene, monochlorobenzene, dichlorobenzene and trichlorobenzene. The structure of dichlorobenzene is not particularly limited, and any one of o-dichlorobenzene, m-dichlorobenzene p-dichlorobenzene may be preferably employed. Likewise, the structure of trichlorobenzene is not particularly limited.

In the present invention, the amount of the benzene or its chlorine derivative in the electrolyte may suitably be adjusted depending upon the amount of the remaining moisture or the pore characteristics of the carbonaceous material contained in the electrodes. It is preferred, however, that the benzene or its chlorine derivative is maintained to be completely dissolved in the organic electrolyte. Further, as the benzene or its chlorine derivative is added, the dielectric constant of the organic electrolyte decreases. Accordingly, the amount of the benzene or its chlorine derivative is preferably controlled within a range where a decrease in the ion conductivity due to a decrease in the dielectric constant of the organic electrolyte, is little. Thus, the amount is preferably from 0.1 to 30 wt %, particularly preferably from 1 to 10 wt %, in the electrolyte.

The operation mechanism in the present invention is not clearly understood, but it is considered that the benzene or its chlorine derivative contained in the electrolyte has high affinity to a pseudo-graphite surface present on the inner walls of pores of the carbonaceous material and is likely to be adsorbed in substitution with the water remaining in fine pores without being removed by the heat treatment. Thus, the remaining water can readily be expelled from the fine pores and discharged in the electrolyte outside the fine pores. When a voltage is applied to the element impregnated with the electrolyte, such water will readily be electrolyzed and gasified.

The storage of electric charge by formation of an electric double layer takes place mainly in the interior of pores. With a conventional electric double layer capacitor containing no benzene or chlorine derivative in the electrolyte, if a voltage is applied to the element impregnated with the electrolyte, a gas generated by the electrolysis of water remaining in the fine pores will remain in the fine pores, whereby the performance of the electric double layer capacitor tends to deteriorate. Whereas, in the present invention, as mentioned above, it is considered that the gas generated by the electrolysis by the remaining water by the application of a voltage, will be present outside the fine pores i.e. not in the fine pores. Namely, it is present in macro pores within the activated carbon particles or in spaces among the particles, or it will be discharged as bobbles out of the element. Thus, it is considered that deterioration of the performance of the electric double layer capacitor can be controlled to be little.

However, the decomposition gas generated by the application of a voltage to the element increases the inner pressure of the electric double layer capacitor cell. Accordingly, it is preferred that the application of the voltage during the production process is carried out in a dry atmosphere in an open condition to discharge the generated gas out of the capacitor cell. Here, the open condition is a condition where the element is not accommodated in a cell or even if it is accommodated in a cell, the cell is not closed.

Here, the dry atmosphere preferably has a dew point of not higher than −20° C., more preferably not higher than −30° C., most preferably not higher than −40° C.

The voltage to be applied to the element is preferably at least 2 V which is higher than the decomposition voltage of water, more preferably at least 2.5 V. The temperature for the application of the voltage to the element is preferably from 15 to 85° C., more preferably from 20 to 70° C. If the voltage is applied under heating, the effect for increasing the durability of the electric double layer capacitor will be large, and the time for application of the voltage can be shortened. However, if the temperature is too high, the initial capacitance tends to decrease, and the internal resistance tends to increase.

Further, in the present invention, it is preferred to maintain the element under reduced pressure after the application of the voltage to the element, whereby the generated gas can more effectively be removed from the element. Here, the "reduced pressure" is preferably a reduced pressure of at most 160 Torr, more preferably at most 10 Torr.

The application of a voltage to the element impregnated with the electrolyte is carried out usually by connecting the electrode constituting a positive electrode for the electric double layer capacitor (hereinafter referred to as the positive electrode of the element) to a plus terminal of a DC power source and connecting the electrode constituting a negative electrode of the electric double layer capacitor (hereinafter referred to as the negative electrode of the element) to a minus terminal of a DC power source. However, in order to further increase the durability of the electric double layer capacitor, it is preferred that this application of a voltage is repeated at least once reversing the connection of the positive electrode and the negative electrode. Namely, the application of a voltage to the element preferably comprises the following steps A and B:

Step A: a step of applying a voltage across the positive and negative electrodes by a DC power source, and Step B: a step of applying a voltage by inversely connecting the positive and negative electrodes to the DC power source as compared with step A.

Here, either step A or step B may be carried out first, or step A and step B may be repeated alternately.

With respect to the electrodes in the present invention, both the positive electrode and the negative electrode contain a carbonaceous material having a specific surface area of from 100 to 3000 $m^2/g$ for forming an electric double layer at the interface with the electrolyte. As such a carbonaceous material, resin type activated carbon such as phenol, coconut shell type activated carbon, coke type activated carbon, pitch type activated carbon, carbon nanotube, carbon aerogel, carbon black or polyacene may, for example, be preferably used. The electrodes are preferably formed by adding an organic binder to at least one type of these carbonaceous materials. Particularly, they are preferably formed by adding an organic binder such as polytetrafluoroethylene or polyvinylidene fluoride to a carbonaceous material, followed by molding into a sheet, which is then bonded to a current collector, or by coating a liquid containing a carbonaceous material and the organic binder on a current collector.

In the present invention, the elute contained in the organic electrolyte to store electric charge by forming an electric double layer, is preferably a quaternary onium salt from the viewpoint of the electrical conductivity, the solubility and the electrochemical stability. Particularly, it preferably has a cation represented on $R^1R^2R^3R^4N^+$ or $R^1R^2R^3R^4P^+$, wherein each of $R^1$, $R^2$, $R^3$ and $R^4$ which are independent of one another, is a $C_{1-6}$ alkyl group or a $C_{6-10}$ aryl group. Particularly preferred is a salt comprising such a cation and an anion of e.g. $BF_4^-$, $PF_6^-$, $CF_3SO_3^-$, $ASF_6^-$, $N(SO_2CF_3)_2^-$ or $ClO_4^-$.

The concentration of the above onium salt in the electrolyte is preferably at least 0.5 mol/l, more preferably at least 1.0 mol/l, for the purpose of securing the ion amount required for forming an electric double layer and for obtaining sufficient electrical conductivity.

The organic solvent to be used for the organic electrolyte is preferably at least one solvent selected from the group consisting of a cyclic carbonate such as ethylene carbonate, propylene carbonate or butylene carbonate, a linear carbonate such as dimethyl carbonate, ethyl methyl carbonate or diethyl carbonate, sulfolane, a sulfolane derivative and a nitrile such as acetonitrile or glutaronitrile.

The separator in the present invention is not particularly limited, but is preferably made of a porous material which is excellent in the electrical insulating property and in the chemical stability against the electrolyte and which is capable of absorbing a large amount of the electrolyte and excellent in the liquid-holding property. Specifically, it is preferably made of inorganic fibers such as glass fibers, silica fibers, alumina fibers or whiskers thereof, natural fibers such as manila hemp, or organic fibers such as synthetic fibers of e.g. polyolefin or polyester. It is preferably a sheet prepared from such fibers. Also preferred is a micro porous film having fine perforations formed by stretching a film made of e.g. polyolefin or polyester.

The structure of electric double layer capacitor of the present invention is not particularly limited and may preferably be any one of a coin structure wherein disk-shaped positive and negative electrodes face each other with a separator interposed therebetween and are impregnated with an electrolyte, a laminated structure wherein rectangular positive and negative electrodes are alternately laminated with a separator interposed therebetween, impregnated with an electrolyte and accommodated in an angular casing, and a winding structure wherein a pair of strip-shaped positive and negative electrodes are wound to face each other with a separator interposed therebetween, impregnated with an electrolyte and accommodated in a cylindrical casing.

Now, the present invention will be described in further detail with reference to Examples (Examples 1 to 12, 15 and 16) and Comparative Examples (Examples 13 and 14). However, it should be understood that the present invention is by no means restricted by such specific Examples.

EXAMPLES 1 to 14

80 parts by weight of high purity phenol resin type activated carbon having a specific surface area of 1800 $m^2/g$ and an average particle size of 10 $\mu m$, 10 parts by weight of carbon black as a conductive material and 10 parts by weight of polyethylene tetrafluoroethylene powder as a binder, were mixed, then kneaded while dropwise adding ethanol and rolled, followed by drying at 200° C. for 30 minutes to remove ethanol thereby to obtain an electrode sheet having a thickness of 140 $\mu m$.

The above electrode sheet was bonded to each side of an aluminum foil current collector with a thickness of 40 $\mu m$ having a lead terminal at a portion having a width of 6 cm and a length of 13 cm, by means of a conductive adhesive, followed by roll pressing to obtain an electrode assembly having the electrode and the current collector integrated and having a thickness of 330 $\mu m$, and this assembly was used for positive and negative electrode assemblies.

A sheet made of glass fibers was punched out in a rectangular shape having a width of 6.6 cm and a length of 13.6 cm to obtain a separator. 18 sheets of the above positive electrode assembly and 18 sheets of the above negative electrode assembly were alternately laminated with the separator interposed to obtain an element. This element was vacuum-dried at 200° C. for 24 hours and then accommodated in a bottomed angular aluminum metal casing having a height of 15 cm, a width of 7 cm and a thickness of 2.2 cm.

As organic electrolytes, those having the additives identified in Table 1 incorporated in the proportions (the concentrations in the electrolytes) as shown in Table 1 to propylene carbonate solutions having 1.5 mol/l of $(C_2H_5)_3(CH_3)NBF_4$ dissolved therein, were prepared. Each organic electrolyte was contacted with a molecular sieve which was preliminarily heated and dehydrated, to remove the water in the electrolyte to a level of not higher than 10 ppm, and then it was injected in the metal casing to impregnate the element therewith.

Further, each element was subjected to voltage application treatment in an open condition and reduced pressure treatment, as shown in Table 1. As shown in Table 1, there are some cases wherein neither the voltage application treatment nor the reduced pressure treatment was carried out. In the voltage application treatment, the positive electrode of the element was connected to a plus terminal of a DC power source and the negative electrode of the element was connected to a minus terminal of the DC power source, and a voltage of 2.8 V was continuously applied for 12 hours in a dry atmosphere (dew point: −50° C.) while the metal casing was open without sealing. The reduced pressure treatment was carried out after the voltage application treatment by maintaining the element under a reduced pressure of 5 torr for one minute.

Then, electrode leads of the positive and negative electrodes were respectively bundled and welded by ultrasonic welding to positive and negative terminals air-tightly and insulatedly attached to an aluminum cover. Then, the cover was fit in the opening of the above metal casing, and the periphery was welded by laser for sealing to obtain an electric double layer capacitor. With respect to samples of Examples 1, 6 and 13 to which no voltage application treatment in an open condition was applied, after sealing each metal casing, the positive electrode of the electric double layer capacitor was connected to a plus terminal of a DC power source, and the negative electrode was connected to a minus terminal of the DC power source, and a voltage of 2.8 V was continuously applied for 12 hours, whereupon the capacitor was used as a complete sample of the electric double layer capacitor.

The initial service capacitance and the internal resistance of each electric double layer capacitor thus obtained, were measured, and then as an accelerated test on reliability of the performance, this capacitor was maintained in a constant temperature tank of 45° C. for 2000 hours while applying a voltage of 2.7 V to carry out a durability test. The service capacitance and the internal resistance after the durability test were measured, and the change in the capacitance and the change in the resistance after the durability test were calculated against the initial properties. The results are shown in Table 2.

EXAMPLE 15

An electric double layer capacitor was prepared in the same manner as in Example 3 except that the voltage application treatment was changed as follows. Namely, the positive electrode of the element was connected to a minus terminal of a DC power source and the negative electrode of the element was connected to a plus terminal of the DC power source, and a voltage of 2.8 v was continuously applied for 6 hours, in a dry atmosphere (dew point: −50° C.) while the metal casing was open without sealing. Then, the positive electrode of the element was connected to the plus terminal of the DC power source, and the negative electrode was connected to the minus terminal of the DC power source, and a voltage of 2.8 V was continuously applied for further 6 hours. The obtained electric double layer capacitor was evaluated in the same manner as in Example 1. The results are shown in Table 2.

EXAMPLE 16

An electric double layer capacitor was prepared in the same manner as in Example 15 except that instead of benzene, 5 wt % of o-dichlorobenzene was incorporated in the electrolyte. This electric double layer capacitor was evaluated in the same manner as in Example 1. The results are shown in Table 2.

TABLE 1

| | Additive | Amount (wt %) | Voltage application treatment in an open condition | Reduced pressure treatment |
|---|---|---|---|---|
| Ex. 1 | Benzene | 5 | Not carried out | Not carried out |
| Ex. 2 | Benzene | 5 | Carried out | Not carried out |
| Ex. 3 | Benzene | 5 | Carried out | Carried out |
| Ex. 4 | Benzene | 2 | Carried out | Carried out |
| Ex. 5 | Benzene | 10 | Carried out | Carried out |
| Ex. 6 | Monochlorobenzene | 5 | Not carried out | Not carried out |
| Ex. 7 | Monochlorobenzene | 5 | Carried out | Not carried out |
| Ex. 8 | Monochlorobenzene | 5 | Carried out | Carried out |
| Ex. 9 | o-dichlorobenzene | 5 | Carried out | Carried out |
| Ex. 10 | m-dichlorobenzene | 5 | Carried out | Carried out |
| Ex. 11 | p-dichlorobenzene | 5 | Carried out | Carried out |
| Ex. 12 | 1,2,4-trichlorobenzene | 5 | Carried out | Carried out |

TABLE 1-continued

| | Additive | Amount (wt %) | Voltage application treatment in an open condition | Reduced pressure treatment |
|---|---|---|---|---|
| Ex. 13 | — | — | Not carried out | Not carried out |
| Ex. 14 | Naphthalene | 5 | Carried out | Carried out |

TABLE 2

| | Initial stage | | After the durability test | | | |
|---|---|---|---|---|---|---|
| | Service capacitance (F) | Internal resistance (mΩ) | Service capacitance (F) | Change in capacitance (%) | Internal resistance (mΩ) | Change in resistance (%) |
| Ex. 1 | 1720 | 2.8 | 1430 | −17 | 5.0 | +80 |
| Ex. 2 | 1700 | 2.7 | 1450 | −15 | 4.5 | +65 |
| Ex. 3 | 1710 | 2.7 | 1470 | −14 | 4.3 | +60 |
| Ex. 4 | 1720 | 2.9 | 1440 | −15 | 4.7 | +62 |
| Ex. 5 | 1710 | 3.0 | 1400 | −16 | 5.5 | +62 |
| Ex. 6 | 1730 | 2.5 | 1440 | −17 | 4.8 | +79 |
| Ex. 7 | 1710 | 2.6 | 1440 | −16 | 4.3 | +66 |
| Ex. 8 | 1710 | 2.6 | 1470 | −14 | 4.2 | +62 |
| Ex. 9 | 1710 | 2.8 | 1500 | −12 | 4.4 | +58 |
| Ex. 10 | 1720 | 2.8 | 1480 | −14 | 4.5 | +61 |
| Ex. 11 | 1710 | 2.7 | 1490 | −19 | 4.3 | +59 |
| Ex. 12 | 1700 | 2.7 | 1280 | −19 | 5.5 | +105 |
| Ex. 13 | 1730 | 3.0 | 950 | −45 | 8.8 | +192 |
| Ex. 14 | 1720 | 2.9 | 480 | −72 | 18.9 | +520 |
| Ex. 15 | 1710 | 2.8 | 1520 | −11 | 4.3 | +55 |
| Ex. 16 | 1720 | 2.7 | 1530 | −11 | 4.2 | +54 |

According to the present invention, it is possible to increase the withstand voltage of an electric double layer capacitor, and it is possible to obtain an electric double layer capacitor which is excellent in reliability of the performance for a long period of time even if a high voltage is applied and which has a high energy density.

What is claimed is:

1. A method for producing an electric double layer capacitor, comprising:
    impregnating an element comprising
        positive and negative electrodes facing each other with a separator interposed between them,
    with an organic electrolyte comprising
        benzene or its chlorine derivative having at least one hydrogen atom of benzene substituted by a chlorine atom,
    said organic electrolyte being capable of forming an electric double layer on the surface of the electrodes to store electric charge,
    said impregnating resulting in substituting water adsorbed to a carbonaceous material contained in said positive and negative electrodes with said benzene or its chlorine derivative, to obtain desorbed water;
    applying a voltage to the element in a dry atmosphere having a dew point of not more than −20° C., thereby expelling said desorbed water from said element; and
    maintaining said element at reduced pressure;
    wherein said positive and negative electrodes comprise said carbonaceous material having a specific surface area of from 100 to 3,000 m²/g; and
    wherein the organic electrolyte further comprises
    a) a solvent selected from the group consisting of ethylene carbonate, propylene carbonate, butylene carbonate, dimethyl carbonate, ethyl methyl carbonate, diethyl carbonate, acetonitrile, glutaronitrile and a mixture thereof; or
    b) a solvent mixture of sulfolane and a solvent selected from the group consisting of ethylene carbonate, dimethyl carbonate, ethyl methyl carbonate, diethyl carbonate, acetonitrile, glutaronitrile and a mixture thereof; or
    c) a solvent mixture of a sulfolan derivative and a solvent selected from the group consisting of ethylene carbonate, dimethyl carbonate, ethyl methyl carbonate, diethyl carbonate, acetonitrile, glutaronitrile and a mixture thereof.

2. The method for producing an electric double layer capacitor according to claim 1, wherein said benzene or its chlorine derivative is at least one member selected from the group consisting of benzene, monochlorobenzene, dichlorobenzene and trichlorobenzene.

3. The method for producing an electric double layer capacitor according to claim 1, wherein the voltage is applied to the element in a dry atmosphere in an open condition.

4. The method for producing an electric double layer capacitor according to claim 1, wherein the benzene or its chlorine derivative is contained in an amount of from 0.1 to 30 wt % in the organic electrolyte.

5. The method for producing an electric double layer capacitor according to claim 1, wherein a voltage of at least 2.5V is applied to the element at a temperature of from 15 to 85° C.

6. The method for producing an electric double layer capacitor according to claim 1, wherein the application of a voltage to the element comprises the following steps A and B:
    Step A: a step of applying a voltage across the positive and negative electrodes by a DC power source, and
    Step B: a step of applying a voltage by inversely connecting the positive and negative electrodes to the DC power source as compared with step A.

7. The method for producing an electric double layer capacitor according to claim 1, wherein the organic electrolyte further comprises a salt comprising a cation represented by $R^1R^2R^3R^4N^+$ or $R^1R^2R^3R^4P^+$, and wherein each of $R^1$, $R^2$, $R^3$ and $R^4$ which are independent of one another, is a $C_{1-6}$ alkyl group or a $C_{6-10}$ aryl group, and an anion of $BF_4^-$, $PF_6^-$, $CF_3SO_3^-$, $AsF_6^-$, $N(SO_2CF_3)_2^-$ or $ClO_4^-$.

8. The method for producing an electric double layer capacitor according to claim 1, wherein after the application of a voltage to the element, the element is maintained under a reduced pressure of at most 160 Torr.

9. A method for producing an electric double layer capacitor, comprising:
    impregnating an element comprising
        positive and negative electrodes facing each other with a separator interposed between them,
    with an organic electrolyte comprising
        benzene or its chlorine derivative having at least one hydrogen atom of benzene substituted by a chlorine atom,
    said organic electrolyte being capable of forming an electric double layer on the surface of the electrodes to store electric charge,
        said impregnating resulting in substituting water adsorbed to a carbonaceous material contained in said positive and negative electrodes with said benzene or its chlorine derivative, to obtain desorbed water;

applying a voltage to the element in a dry atmosphere in an open condition, said dry atmosphere having a dew point of not more than −20° C. thereby expelling said desorbed water from said element; and maintaining said element at reduced pressure;

wherein said positive and negative electrodes comprise said carbonaceous material having a specific surface area of from 100 to 3,000 m$^2$/g; and wherein the organic electrolyte further comprises a) a solvent selected from the group consisting of ethylene carbonate, propylene carbonate, butylene carbonate, dimethyl carbonate, ethyl methyl carbonate, diethyl carbonate, acetonitrile, glutaronitrile and a mixture thereof; or b) a solvent mixture of sulfolane and a solvent selected from the group consisting of ethylene carbonate, dimethyl carbonate, ethyl methyl carbonate, diethyl carbonate, acetonitrile, glutaronitrile and a mixture thereof; or c) a solvent mixture of a sulfolane derivative and a solvent selected from the group consisting of ethylene carbonate, dimethyl carbonate, ethyl methyl carbonate, diethyl carbonate, acetonitrile, glutaronitrile and a mixture thereof.

10. The method for producing an electric double layer capacitor according to claim 9, wherein said benzene or its chlorine derivative is at least one member selected from the group consisting of benzene, monochlorobenzene, dichlorobenzene and trichlorobenzene.

11. The method for producing an electric double layer capacitor according to claim 9, wherein the benzene or its chlorine derivative is contained in an amount of from 0.1 to 30 wt % in the organic electrolyte.

12. The method for producing an electric double layer capacitor according to claim 9, wherein a voltage of at least 2.5V is applied to the element at a temperature of from 15 to 85° C.

13. The method for producing an electric double layer capacitor according to claim 9, wherein the application of a voltage to the element comprises the following steps A and B:

Step A: a step of applying a voltage across the positive and negative electrodes by a DC power source, and Step B: a step of applying a voltage by inversely connecting the positive and negative electrodes to the DC power source as compared with step A.

14. The method for producing an electric double layer capacitor according to claim 9, wherein the organic electrolyte further comprises a salt comprising a cation represented by $R^1R^2R^3R^4N^+$ or $R^1R^2R^3R^4P^+$, and wherein each of $R^1$, $R^2$, $R^3$ and $R^4$ which are independent of one another, is a $C_{1-6}$ alkyl group or a $C_{6-10}$ aryl group, and an anion of $BF_4^-$, $PF_6^-$, $CF_3SO_3^-$, $AsF_6^-$, $N(SO_2CF_3)_2^-$ or $ClO_4^-$.

15. The method for producing an electric double layer capacitor according to claim 9, wherein after the application of a voltage to the element, the element is maintained under a reduced pressure of at most 160 Torr.

16. A method for producing an electric double layer capacitor, comprising:

impregnating an element comprising positive and negative electrodes facing each other with a separator interposed between them, with an organic electrolyte comprising benzene or its chlorine derivative having at least one hydrogen atom of benzene substituted by a chlorine atom, said organic electrolyte being capable of forming an electric double layer on the surface of the electrodes to store electric charge, said impregnating resulting in substituting water adsorbed to a carbonaceous material contained in said positive and negative electrodes with said benzene or its chlorine derivative, to obtain desorbed water;

applying a voltage to the element in a dry atmosphere having a dew point of not more than −20° C., thereby expelling said desorbed water from said element; and maintaining said element at reduced pressure of at most 160 Torr;

wherein said positive and negative electrodes comprise said carbonaceous material having a specific surface area of from 100 to 3,000 m$^2$/g; and wherein the organic electrolyte further comprises a) a solvent selected from the group consisting of ethylene carbonate, propylene carbonate, butylene carbonate, dimethyl carbonate, ethyl methyl carbonate, diethyl carbonate, acetonitrile, glutaronitrile and a mixture thereof; or b) a solvent mixture of sulfolane and a solvent selected from the group consisting of ethylene carbonate, dimethyl carbonate, ethyl methyl carbonate, diethyl carbonate, acetonitrile, glutaronitrile and a mixture thereof; or c) a solvent mixture of a sulfolane derivative and a solvent selected from the group consisting of ethylene carbonate, dimethyl carbonate, ethyl methyl carbonate, diethyl carbonate, acetonitrile, glutaronitrile and a mixture thereof.

17. The method for producing an electric double layer capacitor according to claim 16, wherein said benzene or its chlorine derivative is at least one member selected from the group consisting of benzene, monochlorobenzene, dichlorobenzene and trichlorobenzene.

18. The method for producing an electric double layer capacitor according to claim 16, wherein the voltage is applied to the element in a dry atmosphere in an open condition.

19. The method for producing an electric double layer capacitor according to claim 16, wherein the benzene or its chlorine derivative is contained in an amount of from 0.1 to 30 wt % in the organic electrolyte.

20. The method for producing an electric double layer capacitor according to claim 16 wherein a voltage of at least 2.5V is applied to the element at a temperature of from 15 to 85° C.

21. The method for producing an electric double layer capacitor according to claim 16 wherein the application of a voltage to the element comprises the following steps A and B:

Step A: a step of applying a voltage across the positive and negative electrodes by a DC power source, and Step B: a step of applying a voltage by inversely connecting the positive and negative electrodes to the DC power source as compared with step A.

22. The method for producing an electric double layer capacitor according to claim 16 wherein the organic electrolyte further comprises a salt comprising a cation represented by $R^1R^2R^3R^4N^+$ or $R^1R^2R^3R^4P^+$, and wherein each of $R^1$, $R^2$, $R^3$ and $R^4$ which are independent of one another, is a $C_{1-6}$ alkyl group or a $C_{6-10}$ aryl group, and an anion of $BF_4^-$, $PF_6^-$, $CF_3SO_3^-$, $AsF_6^-$, $N(SO_2CF_3)_2^-$ or $ClO_4^-$.

* * * * *